United States Patent [19]

Homan et al.

[11] 4,271,289
[45] Jun. 2, 1981

[54] OXYGEN-CURABLE MERCAPTO-FUNCTIONAL ORGANIC COMPOUND COMPOSITIONS CATALYZED BY METAL CARBONYL COMPOUNDS AND METHOD OF FORMING HIGHER MOLECULAR WEIGHT PRODUCTS THEREFROM

[75] Inventors: Gary R. Homan; Chi-long Lee, both of Midland, Mich.

[73] Assignee: Dow Corning Corporation, Midland, Mich.

[21] Appl. No.: 99,282

[22] Filed: Dec. 3, 1979

[51] Int. Cl.³ .............................................. C08G 75/04
[52] U.S. Cl. ................................ 528/374; 260/37 R; 528/56; 528/76; 528/77
[58] Field of Search ............... 260/37 R; 528/374, 56, 528/76, 77

[56] References Cited

U.S. PATENT DOCUMENTS

| | | | |
|---|---|---|---|
| 2,466,963 | 4/1949 | Patrick | 260/79.1 |
| 2,964,503 | 12/1960 | Carpenter et al. | 260/79.1 |
| 3,402,155 | 9/1968 | Kutch | 260/79 |

OTHER PUBLICATIONS

Nametkin et al., Journal of Organometallic Chemistry, Elsevier Sequoia S.A., Lausanne, The Netherlands, 149, pp. 355-370 (1978).

*Primary Examiner*—Melvyn I. Marquis
*Attorney, Agent, or Firm*—Richard E. Rakoczy

[57] ABSTRACT

Compositions which are stable in the absence of oxygen are formed by mixing the following substantially in the absence of oxygen (A) 100 parts by weight of at least one mercapto-functional organic compound which contains at least two mercapto groups per molecule;

(B) 0 to 200 parts by weight of at least one filler; and (C) a catalytic amount of a metal carbonyl compound selected from the group consisting of $Fe(CO)_5$, $Fe_2(CO)_9$, $Fe_3(CO)_{12}$, dicyclopentadienyldiiron tetracarbonyl, butadieneiron tricarbonyl, cyclohexadieneiron tricarbonyl, $Ni(CO)_4$, dicyclopentadienyldinickel dicarbonyl, $Mn_2(CO)_{10}$, methylcyclopentadienylmanganese tricarbonyl and cyclopentadienylcobalt dicarbonyl, preferably from 0.1 to 6 parts by weight of an iron carbonyl compound per 100 parts by weight of (A).

Such compositions polymerize or cure upon exposure to oxygen. When used in layers of up to 3 millimeters thick, these compositions polymerize or cure at room temperature in a reasonable amount of time to form higher molecular weight products which are useful as coatings, impregnants or elastomeric sealants.

22 Claims, No Drawings

OXYGEN-CURABLE MERCAPTO-FUNCTIONAL ORGANIC COMPOUND COMPOSITIONS CATALYZED BY METAL CARBONYL COMPOUNDS AND METHOD OF FORMING HIGHER MOLECULAR WEIGHT PRODUCTS THEREFROM

BACKGROUND OF THE INVENTION

1. Field of the Invention

This invention relates to compositions including organic compounds containing sulfur and to a method of forming higher molecular weight products from such compositions. This invention also relates to elastomers and resins consisting of organic polymers containing sulfur.

2. Description of the Prior Art

Compositions consisting of mercapto-functional organic compounds which are free of aliphatic unsaturation such as vinyl and are polymerized or cured by means of the mercapto groups are well-known in the art. Many types of curing or condensing agents have been suggested such as inorganic peroxides such as sodium peroxide or lead peroxide; inorganic oxidizing agents such as chromate or permanganate salts; organic peroxides such as benzoyl peroxide; organic hydroperoxides such as cumene hydroperoxide and other organic curing agents such as polyepoxides, polyisocyanates, organic borates or organic titanates; and the like, many of which are detailed in U.S. Pat. Nos. 2,466,963 and 2,964,503.

Room temperature polymerization or cure of such compounds, which is believed to be caused by oxidation resulting from exposure to atmospheric oxygen, has been accomplished through the use of inorganic chromates such as sodium chromate, paint driers and heavy metal salts such as lead naphthenate or cobalt 2-ethylhexoate.

Nametkin, et al., in the Journal of Organometallic Chemistry, 149, pp. 355–370 (1978) report that when stoichiometric amounts of $Fe(CO)_5$, $Fe_2(CO)_9$, or $Fe_3(CO)_{12}$ are reacted with thiols of the general formula RSH, where R is an alkyl or aryl radical, in solution, a complex $[RSFe(CO)_3]_2$ and a small amount of the disulfide, RSSR, is produced at room temperature and that $Fe_3(CO)_{12}$ is the most effective catalyst. Thermal decomposition of the complex in n-dodecane solution at 160° C. in the presence of air results in decomposition of the complex to form the disulfide. However, this article does not teach that $Fe(CO)_5$, $Fe_2(CO)_9$ or $Fe_3(CO)_{12}$ will function as a catalyst in non-stoichiometric amounts for the room temperature polymerization or cure of the compositions hereinafter described.

We have discovered that the use of metal carbonyl compounds, especially those containing iron such as iron pentacarbonyl, in mercapto-functional organic compounds containing an average of at least two mercapto groups per molecule results in compositions which are storage stable in the substantial absence of oxygen. These compositions can be polymerized or cured upon exposure to air at room temperature to a thickness of 0.5 millimeters after 24 hours and up to 3 millimeters after several weeks. Such products are useful as coatings, impregnants for porous materials and elastomeric sealants.

DESCRIPTION OF THE INVENTION

This invention relates to a composition, stable in the absence of oxygen, which consists essentially of a product obtained by mixing the following substantially in the absence of oxygen.

(A) 100 parts by weight of at least one mercapto-functional organic compound which contains an average of at least two mercapto groups per molecule and is free of silicon atoms, aliphatic unsaturation and radicals which are reactive with mercapto groups at room temperature;

(B) 0 to 200 parts by weight of a filler; and (C) a catalytic amount of a metal carbonyl compound selected from the group consisting of $Fe(CO)_5$, $Fe_2(CO)_9$, $Fe_3(CO)_{12}$, dicyclopentadienyldiiron tetracarbonyl, butadieneiron tricarbonyl, cyclohexadieneiron tricarbonyl, $Ni(CO)_4$, dicyclopentadienyldinickel dicarbonyl, $Mn_2(CO)_{10}$, methylcyclopentadienylmanganese tricarbonyl and cyclopentadienylcobalt dicarbonyl.

This invention also relates to a method of forming a higher molecular weight product which consists essentially of the steps of (I) mixing 100 parts by weight of at least one of the mercapto-functional organic compounds defined in (A) above and a catalytic amount of a metal carbonyl compound as defined in (C) above to form a mixture and (II) exposing said mixture to oxygen. This invention further relates to the product obtained by exposing the above composition or mixture to oxygen.

For the purposes of the present application, the following terms will be defined. The term "oxygen" is intended to mean gaseous oxygen which can be in the form of atmospheric or pure oxygen gas. The term "organic compound" is intended to mean organic compounds which do not contain silicon atoms and are free of both aliphatic unsaturation and radicals which are reactive with mercapto groups at room temperature such as epoxy and isocyanate. "Organic compounds" also includes polymeric compounds. A further distinction will be made by defining a "lower molecular weight compound" to be an organic compound possessing a molecular weight of less than 1000 and such term also includes dimeric and trimeric compounds. Organic "polymers" are defined as organic compounds possessing a molecular weight of greater than 1000 and containing more than three repeating units per molecule. Because some lower molecular weight compounds can possess more than three repeating units and have a molecular weight under 1000, such compounds will be classified as polymers solely on the basis of the number of repeating units in the molecule. "Mercapto-functional" is intended to mean that the molecule possesses mercapto groups which are —SH groups in the traditional chemical sense.

Compositions containing silicon in the form of mercaptoorganosiloxanes are the subject of U.S. Patent Application Ser. No. 099,252, filed on Dec. 3, 1979, now pending in group to Gary R. Homan and Chi-Long Lee, entitled "Oxygen-Curable Mercaptoorganosiloxane Compositions Catalyzed By Metal Carbonyl Compounds And Methods Of Forming Higher Molecular Weight Products Therefrom", and compositions containing both organosilicon compounds and organic compounds are the subject of U.S. Patent Application Ser. No. 099,254, filed on Dec. 3, 1979, to Gary R. Homan and Chi-Long Lee, entitled "Oxygen-Curable Mercapto-Functional Organosilicon-Organic Compound Compositions Catalyzed By Metal Carbonyl Compounds And Method Of Forming Higher Molecular Weight Product Therefrom", both of which are assigned to the same assignee as the present invention.

Catalyzed compositions begin to polymerize or cure upon contact with oxygen. Therefore, the containers used to store the catalyzed compositions should be carefully selected to avoid materials which are sufficiently oxygen permeable to appreciably affect storage stability. Techniques for mixing compositions which are oxygen or moisture sensitive are well-known in the art. For example, low-shear mixers can be used for lower viscosity compositions while bread dough mixers can be used for more viscous compositions such as sealant formulations which contain fillers.

This invention has two aspects. One is a novel method of polymerizing or curing mercapto-functional organic compounds to form higher molecular weight products. The other is directed toward the formation of storage-stable compositions. In order to accomplish the first aspect, one merely exposes a mixture of the mercapto-functional organic compound and a metal carbonyl compound to oxygen. Thus, if storage stability is not required, the mercapto-functional organic compound and metal carbonyl compound can be mixed together in the presence of oxygen and immediately allowed to polymerize or cure.

When storage-stable compositions are desired, the ingredients are mixed together in the substantial absence of oxygen by any well-known means. The preferred procedure which can be used to maximize storage life involves mixing the organic compounds and fillers, if any, under a dry nitrogen atmosphere. The mixture can then be subjected to a vacuum, such as 30 millimeters of mercury, for a short time to remove any trapped oxygen and water. The catalyst can then be added, preferably as a solution in a suitable solvent or diluent such as toluene or mineral oil. Many of these catalysts are sensitive to oxygen and/or water, especially the cobalt and nickel compounds (some of these compounds also absorb carbon dioxide). It is, therefore, preferable that the mixed compositions be substantially free of both water and oxygen to maximize storage life. Small amounts of water appear to reduce the cure rate slightly while the presence of oxygen will cause premature gelation.

Mercapto-functional organic compounds useful in compositions of the present invention are well-known in the art and can be any organic compounds which contain an average of at least two mercapto groups per molecule and are free of silicon atoms, aliphatic unsaturation and radicals which are reactive with mercapto groups, such as epoxy or isocyanate, which would render stored compositions of the present invention unstable. Such compounds can be of the general formula $Q(SH)_x$ where x has an average value greater than or equal to 2 and Q is a divalent or polyvalent hydrocarbon which can also contain heteroatoms such as halogen, oxygen, nitrogen, or sulfur. Such compounds can be monomers, such as 1,2-dimercaptoethane; dimers such as $HS(CH_2)_2SS(CH_2)_2SH$ or $HS(CH_2)_2O(CH_2)_2SH$, trimers such as $HS(CH_2CH_2OCH_2OCH_2CH_2SS)_2CH_2CH_2OCH_2OCH_2CH_2SH$ and polymers such as $HSCH_2COOCH_2(CH_2OCH_2)_yCH_2OOCCH_2SH$ where the average value of y is greater than 3.

Lower molecular weight mercapto-functional organic compounds can be those which are aliphatic such as 1,2-dimercaptoethane, 1,3-dimercapto-3-methylbutane, 1,6-dimercaptohexane, 1,12-dimercaptododecane, or 1,2,3-trimercapto-2-methylbutane; cycloaliphatic such as 1,2,3-trimercaptocyclohexane or 1,2-dimercaptocycloheptane; aromatic such as 1,2-dimercaptobenzene or 3,4-dimercaptotoluene; or alkylaromatic such as alpha,2-dimercaptotoluene. Lower molecular weight mercapto-functional organic compounds containing heteroatoms can be compounds containing oxygen such as ethers such as those of the general formulas $(HSR^1)_2O$ or $HS(C_3H_6O)_2C_3H_6SH$; complete esters such as those of the general formula $(HSR^2COO)_2R^3$, $R^4C(CH_2OOCR^2SH)_3$, $C(CH_2OOCR^2SH)_4$, $(HSR^2COOCH_2)_3CCH_2OCH_2C(CH_2OOCR^2SH)_3$, $\{HSR^2COO(H)C\}\{CH_2OOCR^2SH\}_2$ or $(HSR^2COOCH_2)_3CCH_2OCH_2C(CH_2OOCR^2SH)_2CH_2OCH_2C(CH_2OOCR^2SH)_3$ wherein $R^1$ ia alkylene of 2 to 4 inclusive carbon atoms, $R^2$ is alkylene of 1 to 20 inclusive carbon atoms or phenylene, $R^3$ is alkylene of 2 to 6 inclusive carbon atoms and $R^4$ is an alkyl radical of 1 to 2 inclusive carbon atoms. Compounds containing nitrogen can be tris(2-mercaptoethyl)amine, $(HSCH_2CH_2)_2NCH_2CH_2N(CH_2CH_2SH)_2$ or 3,5-dimercaptopyridine; compounds containing sulfur can be $HSCH_2CH_2SSCH_2CH_2SH$ or $HS(C_3H_6)S(C_3H_6)SH$; and compounds containing halogen can be compounds such as 1,3-dimercapto-4-chlorobenzene. The mercapto-functional carboxylic acid esters containing three or more mercapto groups per molecule are preferred. Such esters can be used as the sole type of mercapto-functional organic compound in compositions which cure to resinous products or as cross-linking agents when used in combination with the polymers discussed below. Methods for the preparation of the various types of mercapto-functional organic compounds described above are well-known in the art and can be found in treatises such as The Chemistry of the Thiol Group, Part 1, Patai, editor, John Wiley and Sons, N.Y., pp. 163-269 (1974) and in the patent literature such as in U.S. Pat. No. 4,082,790 which are both hereby incorporated by reference for the purpose of teaching the production of compounds useful in the present invention.

Polymers useful in the mixtures of the present invention include organic polymers containing an average of at least two mercapto groups per molecule which do not contain silicon such as alkylene sulfide polymers such as those taught in U.S. Pat. Nos. 2,466,963; or 3,056,841; arylene (amylene) sulfide polymers such as those taught in British Pat. No. 1,056,226; oxyalkylene polymers such as those taught in U.S. Pat. No. 3,258,495; urethane polymers such as those taught in U.S. Pat. No. 3,114,734; British Pat. No. 1,133,365 or Canadian Pat. No. 911,098; organic polymers containing different types of organic polymer segments within the same polymer molecule (for example, where one type of segment contains disulfide linkages and the other contains oxyalkylene linkages) such as those taught in Canadian Pat. No. 783,649; and organic polymers wherein the mercapto group has been added to the polymer by esterifying a mercapto-functional carboxylic acid, such as 3-mercaptopropionic acid, to an organic polymer containing free hydroxyl groups, such as a polyalkylene glycol, to produce a polymer of the general formula $(HSGCOO)(R^3OR^3)_y(OOCGSH)$ where G is alkylene of 1 to 20 inclusive carbon atoms or phenylene, and $R^3$ and y are as defined above. The eight immediately preceding patents dealing with polymers are hereby incorporated by reference to teach the production of silicon-free organic polymers useful in compositions of the present invention.

Compositions useful in the present invention can be prepared from single polymers or mixtures of polymers of the same general chemical class (which differ only in molecular weight) or from mixtures of polymers of different chemical classes such as a mixture of a mercapto-functional polysulfide polymer with a mercapto-functional polyurethane polymer, provided that the polymers are compatible with each other. Likewise, the metal carbonyl compound catalyst should be sufficiently soluble in the composition to result in a satisfactory amount of polymerization or cure without necessitating the use of large amounts of catalyst. Generally, greater than 6 parts by weight of catalyst per 100 parts by weight of mercapto-functional organic compound is excessive. Preferably, the mercapto-functional organic compounds, especially the polymers, exist as liquids at room temperature. In coating and low-consistency elastomeric sealant applications, liquid mercapto-functional organic compounds minimize the need for the use of solvents in the formulation to produce an acceptable viscosity.

Preferred among the polymers useful in compositions of the present invention are polysulfide polymers which are liquid at room temperature, such as those taught by U.S. Pat. No. 2,466,963. Such polymers can be represented by the general formula $(HS(R^5SS)_zR^5SH)$ where $R^5$ is a divalent hydrocarbon radical, oxyalkylene radical such as $(-C_2H_4OCH_2OC_2H_4-)$, or thiohydrocarbon radical such as $(-C_2H_4SC_2H_4-)$, preferably $R^5$ is selected from the group consisting of divalent oxyalkylene radicals of the general formulas $(-R^1OCH_2OR^1-)$ and $(-R^1OR^1-)$ where $R^1$ is alkylene of 2 to 4 inclusive carbon atoms; z has an average value of 1 to 50, preferably from 4 to 23; and can also include tri-functional and/or tetra-functional molecules such as $\{-SSCH(CH_2SS-)_2\}$ to produce branching in the polymer chain. The preferred polysulfide polymers described above can be described as organic polydisulfidepolymercaptan polymers having a molecular weight of approximately 500 to 12,000 which contain multiply recurring disulfide $(-SS-)$ linkages between carbon atoms, exist as a liquid at 25° C. and contain an average of at least two mercapto groups per molecule.

Several means for obtaining a cured composition with particular properties are available. One means was mentioned above and consists of mixing polymers and/or lower molecular weight compounds containing an average of two mercapto groups per molecule with lower molecular weight organic compounds containing three or more mercapto groups per molecule. Use of lower molecular weight organic compounds containing three or more mercapto groups per molecule increases the cross-link density of the cured polymer. Increases in cross-link density are generally evidenced by changes in the physical properties of the cured product such as an increase in hardness or brittleness. The same result can also be accomplished by incorporating polymers which contain an average of 3 or more mercapto groups per molecule into such a composition. Products which are hard and highly cross-linked are useful as coatings for articles such as electronic components and circuit boards.

Polymers containing an average of more than two mercapto groups per molecule can be used as the sole type of polymer in a composition to produce a cured product useful as a coating. The cross-link density of the cured products can also be increased by increasing the total number of mercapto groups per polymer molecule. By selecting a polymer with an adequate number of mercapto groups, a composition can be obtained which cures to a satisfactory hardness without the use of additional cross-linking agents such as lower molecular weight compounds and/or polymers.

Elastomeric sealant formulations generally require a certain degree of ability to elongate without tearing. Thus the use of major amounts (greater than 50% by weight) of organic compounds containing an average of only two mercapto groups per molecule, preferably linear organic compounds, is desirable in such formulations. A sufficient amount of lower molecular weight compounds containing three or more mercapto groups per molecule is generally included to produce a cured elastomer with a tack-free surface.

Organic compounds which contain only two mercapto groups per molecular are only capable of polymerization by chain-extension and generally produce tacky gums unless the organic compound used initially is either sufficiently cross-linked or high enough in molecular weight to result in a tack-free surface after exposure to oxygen. Such tacky gums could be used as soft protective coatings which are later removed by peeling the coating from the article to be protected or by dissolving the coating with a solvent. Such compositions can also find use as impregnants for porous materials which absorb the composition.

Fillers and pigments may be used with the compositions of this invention, but are not required. Extending fillers can preferably be used in amounts of 10 to 200 parts by weight per 100 parts by weight of mercapto-functional organic compound, especially in elastomeric sealant formulations. Suitable extending fillers can be calcium carbonate, talc, ground or crushed quartz, diatomaceous earth, fibrous fillers such as glass or asbestos and the like. Reinforcing fillers such as fume silica, surface-treated silica, carbon black, and the like may also be used. As is well-known in the art, reinforcing fillers cannot be used in as large an amount as extending fillers can be used, thus any formulation including such fillers generally would not contain more than 70 parts by weight of reinforcing fillers per 100 parts by weight of the mercapto-functional organic compound and preferably, from 5 to 30 parts. Extending fillers can also be included in formulations containing reinforcing fillers in amounts of up to 200 parts by weight per 100 parts by weight of the mercapto-functional organic compounds less the amount of reinforcing filler present, provided that the capacity of the mercapto-functional organic compounds to accept such amounts of filler is not exceeded. Pigments, such as titanium dioxide or coloring pigments and other additives such as fire-retardant additives, plasticizers and the like are also contemplated as being useful in compositions of the present invention. Routine testing can be used to determine the effect of fillers and additives on the composition and its shelf life.

Metal carbonyl compounds contemplated as being useful as catalysts in the practice of the present invention are $Fe(CO)_5$, $Fe_2(CO)_9$, $Fe_3(CO)_{12}$, dicyclopentadienyldiiron tetracarbonyl or $\{(C_5H_5)Fe(CO)_2\}_2$, butadieneiron tricarbonyl or $(C_4H_6)Fe(CO)_3$, cyclohexadieneiron tricarbonyl or $(C_6H_8)-Fe(CO)_3$, $Ni(CO)_4$, dicyclopentadienyldinickel dicarbonyl or $\{(C_5H_5)Ni(CO)\}_2$, $Mn_2(CO)_{10}$, methylcyclopentadienylmanganese tricarbonyl or $(CH_3C_5H_4)Mn(CO)_3$ and cyclopentadienylcobalt dicarbonyl. The amount of catalyst necessary is not critical. Any catalytic amount can be employed which will adequately polymerize or cure the compositions in the presence of oxygen to result in a product which is satisfactory for the desired end use. Changing the level of catalyst can alter the properties of the product, especially in the elastomeric products. We have found that a catalytic amount in the range of 0.1 to 6 parts by weight of metal carbonyl compound per 100 parts by weight of mercapto-functional organic compound is usually sufficient. The preferred metal carbonyl compounds are those containing iron. When iron carbonyl catalysts are employed, it can be preferable to formulate the compositions such that the ratio of total moles of mercapto groups (—SH) present in the mercapto-functional organic compounds to total moles of iron atoms in the catalyst (SH/Fe ratio) is greater than one. Iron carbonyl compounds are known to be toxic and somewhat volatile, therefore, care should be exercised when such compounds are handled and adequate ventilation should be provided during the polymerization or cure of these compositions.

As previously noted, many of the metal carbonyl compounds are affected by oxygen and/or water and some may even absorb carbon dioxide. This is especially true of the cobalt and nickel compounds. Thus, to aid in the handling of the compounds and to speed the incorporation of the catalyst into the composition, it is preferable to first dissolve the metal carbonyl compounds in a hydrophobic solvent or diluent such as toluene or mineral oil. Metal carbonyl compounds are well-known in the art and methods for their preparation may be found in the literature, for example, in Organometallic Compounds, Volume I, Dub, editor, Springer-Verlag, N.Y. (1966) and Handbook of Organometallic Compounds, Hagihara, Kumada and Okawara, editors, W. A. Benjamin Co., N.Y., pp. 822–903 (1968) which are both hereby incorporated by reference to teach the production of the above metal carbonyl compounds.

It is believed that compositions of the present invention polymerize or cure to form higher molecular weight products by the formation of disulfide (—SS—) bonds upon exposure to oxygen due to the action of the metal carbonyl catalyst. The compositions polymerize or cure at room temperature and appear to polymerize or cure from the surface in contact with oxygen inward. It appears that the cure rate of the unexposed material is affected by the ability of oxygen to diffuse through the polymerized or cured layer above because the rate of cure appears to slow as the layer above thickens. Thin layers of product of up to 0.5 millimeters thick are formed within 24 hours after exposure to air at room temperature and layers of up to 3 millimeters thick can be obtained under the same conditions after several weeks time. Layers of more than 3 millimeters in thickness can require an unacceptable amount of time (more than two weeks) to cure when exposed to oxygen at room temperature. Thus room temperature cure of these compositions is acceptable for coating applications which only require thin films (paint films generally range from 0.01 to 0.5 millimeters in thickness) and elastomeric sealant applications, such as in sealing mullion joints, where thickness of up to 3 millimeters are used. Such room temperature-curable compositions may also find use as impregnating compositions for porous materials such as leather or other materials which are sensitive to heat. On the other hand, application of heat will accelerate the rate of polymerization or cure in the manner that most chemical reactions are accelerated by a rise in temperature and heating can be advantageous where a protective coating of resin is being applied to a substrate.

When prepared substantially in the absence of oxygen, catalyzed compositions of the present invention are one-package compositions which are storage stable for relatively long periods of time. Approximately one year of shelf life without an unacceptable increase in viscosity is anticipated when such compositions are stored in sealed aluminum containers such as tubes commonly used for storing toothpaste. Upon application or extrusion, the compositions polymerize or cure upon exposure to atmospheric oxygen and require no mixing or addition of cross-linking agents by the end-user. Other advantages and uses for compositions of the present invention will be readily apparent to those skilled in the art.

The following examples are intended as being merely illustrative and are not to be construed as limiting the scope of the present invention which is properly defined by the appended claims. Unless otherwise indicated, all percentages used in the following examples are by weight.

EXAMPLE 1

The preparation and cure of a one-package oxygen-curable composition of the present invention was demonstrated by the example. Twenty grams of dipentaerythritol hexakis (3-mercaptopropionate) was added to a low density polyethylene SemKit® tube (commercially available from Semco, Inc., division of Products Research and chemical Corporation, Glendale, CA) which is a cylinder having the appearance of a tube commonly used for caulking compounds, contains a means for stirring the contents and is designed to be placed in a vacuum to remove volatile materials from compositions placed inside the tube. Because the compound was added in the presence of air, it was de-aired by subjecting it to a vacuum of 30 millimeters of mercury for approximately 30 minutes. A seal was then placed on the back of the tube. One-half gram of a 10% solution of iron pentacarbonyl ($Fe(CO)_5$) in mineral oil was injected into the sealed SemKit® tube and the stirrer was used to evenly incorporate the catalyst solution into the base. A sample of the catalyzed compound was exposed to air at room temperature (22° C.). After 30 minutes exposure, no apparent surface changes were noted. After 90 minutes, gelation of the surface was apparent, but did not completely cover the surface. A surface layer which was tack-free to a touch with a sheet of polyethylene was observed after 3 hours. After 24 hours, a surface layer approximately 0.5 millimeters (mm) thick had formed. The calculated molar ratio of SH/Fe in this example is 600/1.

After 3 days storage at room temperature, the catalyzed composition remaining in the sealed SemKit® tube was essentially unchanged in viscosity. A sample of the stored compound was extruded and exposed to air at room temperature. A tacky layer completely covering the surface was observed after approximately 1.9 hours.

EXAMPLE 2

A composition consisting of 20 grams of dipentaerythritol hexakis(3-mercaptopropionate) and 0.5 grams of iron pentacarbonyl (neat) was prepared in an open dish. The composition was mixed and stored in the presence of air at room temperature (22° C.). A surface layer of gelled material formed after approximately 3.8 hours. After 7 days exposure to air at room temperature, a glossy skin approximately 0.6 mm thick had formed. The calculated molar ratio of SH/Fe in this example is 60/1.

EXAMPLE 3

Oxygen cure of a catalyzed composition containing a liquid polydisulfidepolymercaptan polymer was demonstrated in this example. The following composition was prepared using a commercially-coated liquid polydisulfidepolymercaptan polymer of the average general formula

which contained 1.8% by weight mercapto groups, had a viscosity of 40 pascal-seconds at 27° C. and reportedly contained approximately 2% of tri-functional molecules to produce a small degree of polymer branching. Twenty grams of the above liquid polydisulfidepolymercaptan polymer, 2 grams of dipentaerythritol hexakis(3-mercaptopropionate) and 0.5 grams of iron pentacarbonyl (neat) were admixed in a dish open to the atmosphere. The calculated molar ratio of SH/Fe in this example is 10/1.

A portion of the above mixture was quickly transferred to each of two open dishes for curing in the presence of air at room temperature (22° C.) and in a forced-air oven at 150° C. The sample stored at 22° C. exhibited some surface gelation after four hours. After seven days exposure to air at room temperature, a surface layer approximately 0.8 millimeters thick had developed. The second sample cured at 150° C. developed a surface skin approximately 0.3 millimeters thick after 3 minutes.

That which is claimed is:

1. A composition, stable in the absence of oxygen, which consists essentially of a product obtained by mixing the following substantially in the absence of oxygen
   (A) 100 parts by weight of at least one mercapto-functional organic compound which contains an average of at least two mercapto groups per molecule and is free of silicon atoms, aliphatic unsaturation and radicals which are reactive with mercapto groups at room temperature;
   (B) 0 to 200 parts by weight of at least one filler; and
   (C) a catalytic amount of a metal carbonyl compound selected from the group consisting of $Fe(CO)_5$, $Fe_2(CO)_9$, $Fe_3(CO)_{12}$, dicyclopentadienyldiiron tetracarbonyl, butadieneiron tricarbonyl, cyclohexadieneiron tricarbonyl, $Ni(CO)_4$, dicyclopentadienyldinickel dicarbonyl, $Mn_2(CO)_{10}$, methylcyclopentadienylmanganese tricarbonyl and cyclopentadienylcobalt dicarbonyl.

2. The composition as claimed in claim 1 wherein the catalytic amount of (C) is in the range of 0.1 to 6 parts by weight of metal carbonyl compound per 100 parts by weight of (A).

3. The composition as claimed in claim 2 wherein the metal carbonyl compound is $Fe(CO)_5$.

4. The composition as claimed in claims 2 or 3 wherein (A) is at least one mercapto-functional organic compound selected from the group consisting of $R^4C(CH_2OOCR^2SH)_3$, $C(CH_2OOCR^2SH)_4$, $(HSR^2COOCH_2)_3CCH_2OCH_2C(CH_2OOCR^2SH)_3$, $\{HSR^2COO(H)C\}\{CH_2OOCR^2SH\}_2$ and $(HSR^2COOCH_2)_3CCH_2OCH_2C(CH_2OOCR^2SH)_2CH_2OCH_2C(CH_2OOCR^2SH)_3$ wherein $R^2$ is alkylene of 1 to 20 inclusive carbon atoms or phenylene and $R^4$ is an alkyl radical of 1 to 2 inclusive carbon atoms.

5. The composition as claimed in claim 4 having admixed therewith at least one organic polydisulfidepolymercaptan polymer having a molecular weight of approximately 500 to 12,000 which contains multiply recurring disulfide (—SS—) linkages between carbon atoms, exists as a liquid at 25° C. and contains an average of at least two mercapto groups per molecule.

6. A composition which consists essentially of a product formed upon exposure of the composition of claim 3 to oxygen.

7. A cured composition which consists essentially of a product formed upon exposure of the composition of claim 4 to oxygen.

8. A cured composition which consists essentially of a product formed upon exposure of the composition of claim 5 to oxygen.

9. A method of forming a higher molecular weight product which consists essentially of the steps of
   (I) mixing
      (a) 100 parts by weight of at least one mercapto-functional organic compound which contains an average of at least two mercapto groups per molecule and is free of silicon atoms, aliphatic unsaturation and radicals which are reactive with mercapto groups at room temperature and
      (b) a catalytic amount of a metal carbonyl compound selected from the group consisting of $Fe(CO)_5$, $Fe_2(CO)_9$, $Fe_3(CO)_{12}$, dicyclopentadienyldiiron tetracarbonyl, butadieneiron tricarbonyl, cyclohexadieneiron tricarbonyl, $Ni(CO)_4$, dicyclopentadienyldinickel dicarbonyl, $Mn_2(CO)_{10}$, methylcyclopentadienylmanganese tricarbonyl and cyclopentadienylcobalt dicarbonyl, to form a mixture and
   (II) exposing said mixture to oxygen 10. The method as claimed in claim 9 wherein the amount of metal carbonyl compound present is in the range of from 0.1 to 6 parts by weight per 100 parts by weight of (I)(a) and the metal carbonyl compound is $Fe(CO)_5$.

11. The method as claimed in claim 9 wherein the mixture of (I) additionally contains up to 200 parts by weight of at least one filler per 100 parts by weight of (I)(a).

12. A composition which consists essentially of the higher molecular weight product obtained in accordance with the method of claim 9.

13. A composition which consists essentially of the higher molecular weight product obtained in accordance with the method of claim 10.

14. A composition which consists essentially of the higher molecular weight product obtained in accordance with the method of claim 11.

15. The composition as claimed in claim 1 wherein the metal carbonyl compound is selected from the group consisting of $Fe(CO)_5$, $Fe_2(CO)_9$, $Fe_3(CO)_{12}$, dicyclopentadienyldiiron tetracarbonyl, butadieneiron tricarbonyl and cyclohexadieneiron tricarbonyl, the amount of said metal carbonyl compound present being such that the ratio of total moles of mercapto groups present in (A) to total moles of iron atoms present in said metal carbonyl compound is greater than one.

16. The composition as claimed in claim 1 wherein the metal carbonyl compound is $Fe(CO)_5$, the catalytic amount of $Fe(CO)_5$ is in a range of 0.1 to 6 parts by weight per 100 parts by weight of (A) and the amount of $Fe(CO)_5$ present is such that the ratio of total moles of mercapto groups present in (A) to total moles of iron atoms present in the $Fe(CO)_5$ is greater than one.

17. The composition as claimed in claim 1 which contains at least one filler.

18. The composition as claimed in claim 2 which contains at least one filler.

19. The composition as claimed in claim 3 which contains at least one filler.

20. The composition as claimed in claim 6 which contains at least one filler.

21. The composition as claimed in claim 15 which contains at least one filler.

22. The composition as claimed in claim 16 which contains at least one filler.

* * * * *

UNITED STATES PATENT AND TRADEMARK OFFICE
CERTIFICATE OF CORRECTION

PATENT NO. : 4,271,289

DATED : June 2, 1981

INVENTOR(S) : Gary R. Homan et al.

It is certified that error appears in the above—identified patent and that said Letters Patent is hereby corrected as shown below:

In column 4, line 16, "ia" should read --is--.

In column 5, line 28, "$(HS(R^5SS)_z R^5 SH$" should read --$HS(R^5SS)_z R^5 SH$--.

In column 9, line 11, "commercially-coated" should read --commercially-obtained--.

In column 2, line 59, the phrase "now pending in group" should be deleted.

In column 8, line 32, "chemical" should read --Chemical--.

Signed and Sealed this

Twentieth Day of April 1982

[SEAL]

Attest:

GERALD J. MOSSINGHOFF

Attesting Officer  Commissioner of Patents and Trademarks